Patented Oct. 9, 1951

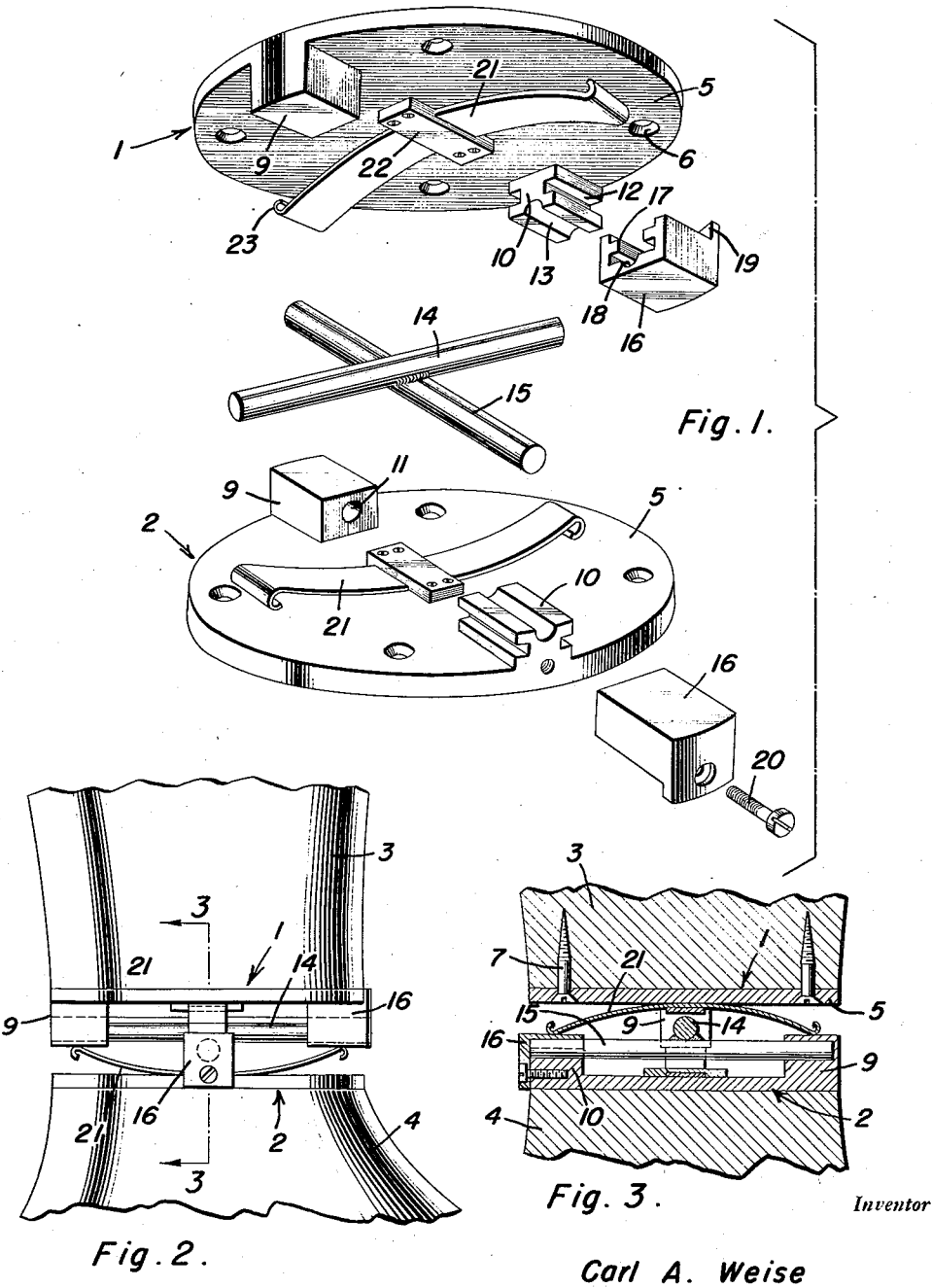

2,570,735

UNITED STATES PATENT OFFICE 2,570,735

FLEXIBLE JOINT FOR ARTIFICIAL LIMBS

Carl A. Weise, Kansas City, Mo.

Application March 18, 1949, Serial No. 82,076

1 Claim. (Cl. 287—92)

The present invention relates to new and useful improvements in artificial limbs and more particularly to the ankle joint therefor.

An important object of the invention is to provide a flexible joint between the foot and lower leg members of an artificial leg constructed to permit a universal movement which will closely resemble the movement of the ankle joint of a human foot.

A further object of the invention is to provide a novel construction for assembling the parts of the joint to the leg and foot members.

A still further object of the invention is to provide an ankle joint constructed of duplicate upper and lower parts for attaching respectively to the leg and foot of an artificial limb to thus simplify and reduce the cost of manufacture of the joint by reason of the interchangeable parts.

A still further object is to provide a device of this character of simple construction, which is efficient and reliable in use, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a group perspective view of the several parts of the upper and lower joint members;

Figure 2 is a fragmentary side elevational view showing the joint attached to the leg and foot members of an artificial limb; and Figure 3 is a fragmentary vertical sectional view taken on a line 3—3 of Figure 2.

Referring now to the drawing in detail wherein, for the purpose of illustration, I have disclosed a preferred embodiment of the invention, the numerals 1 and 2 designate generally the upper and lower joint members of duplicate construction and, accordingly, a detailed description of one will suffice for both. Each joint member comprises a disk 5 having openings 6 for receiving screws or other fasteners 7 to secure the same to the lower end of a leg member 3 of an artificial limb and to an artificial foot 4, respectively.

A pair of lugs or blocks 9 and 10 are formed or otherwise suitably carried at the outer surface of each disk at diametrically opposite sides thereof, the lug 9 having a radially extending opening 11 at its inner end. The lug 10 is of substantially rectangular shape and formed at its opposite sides with longitudinal grooves or channels 12 and formed at its outer surface with a longitudinal semi-cylindrical groove 13. A pair of cross bars 14 and 15 are welded or otherwise suitably secured to each other at their central portions in crossed relation, the ends of one of the bars being positioned in the opening 11 and groove 13 of the lugs 9 and 10 of one of the disks, while the ends of the other bar 15 are positioned in the opening of lug 9 and in the groove 13 of lug 10 of the other disk.

The end of the bar is held in groove 13 by a bearing cap 16 of substantially U-shape in cross-section and formed with opposed ribs 17 on the inside of the cap slidably received in the grooves 12 of the lug 10. The cap 16 is also formed with a semi-cylindrical groove 18 opposed to groove 13 and coacting therewith to form a bearing for the end of the rod.

The outer end of cap 16 is formed with a flange 19 secured to the edge of the disk by a screw 20. The outer ends of both of the lug 9 and cap 16 are closed to hold the rod against endwise movement.

An arcuate leaf spring 21 is secured to the opposed surface of each disk 5 by means of an attaching plate 22 suitably secured at the center of the disk, the ends of the spring being curved outwardly from the surface of the disk and rolled inwardly toward the disk as shown at 23.

The joints are assembled by attaching one disk 5 to the lower end of leg member 3 of an artificial limb and attaching the other disk to the foot 4.

Crossed bars 14 and 15 are positioned respectively in the openings 11 of lugs 9 and grooves 13 of lugs 10 of the disks and held therein by caps 16. The springs 21 extend at right angles to the bars of their respective disks so that the rounded ends 23 of the springs bear against the lug 9 and cap 16 of an opposed disk to space the disks from each other and to space the lugs of one disk from the other disk, as shown in Figure 2.

By mounting the springs in the manner indicated, universal movement of the foot is permitted so that the ankle joint closely approximates the movement of a human foot. This will aid a person in walking on uneven surfaces.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

An ankle joint for artificial limbs comprising duplicate upper and lower joint members, each member including an attaching plate, a pair of aligned bearings on the opposed faces of the members, at least one of said bearings comprising a block having a groove in its face, a cap slidably connected to the block and having an internal groove in matching position with the first-named groove, tongue and groove means securing the cap on the block, a pair of rods connected to each other in crossed relation and having their ends rockably positioned in the bearings of the respective attaching plates, and leaf springs secured to said plates at substantially the centers thereof and located on confronting surfaces of said plates yieldably holding the plates in spaced relation from each other.

CARL A. WEISE.

REFERENCES CITED

The following references are of record in the file of this patent:

UNITED STATES PATENTS

| Number | Name | Date |
|---|---|---|
| 439,312 | Torrey | Oct. 28, 1890 |
| 1,324,898 | Hopcraft | Dec. 16, 1919 |
| 1,334,861 | Ingebrigtsen | Mar. 23, 1920 |
| 1,370,299 | Flanagan | Mar. 1, 1921 |

FOREIGN PATENTS

| Number | Country | Date |
|---|---|---|
| 391,635 | Great Britain | of 1933 |